T. N. Lupton.
Harvester Rake.
No. 13,596.  Patented Sep. 25, 1855.
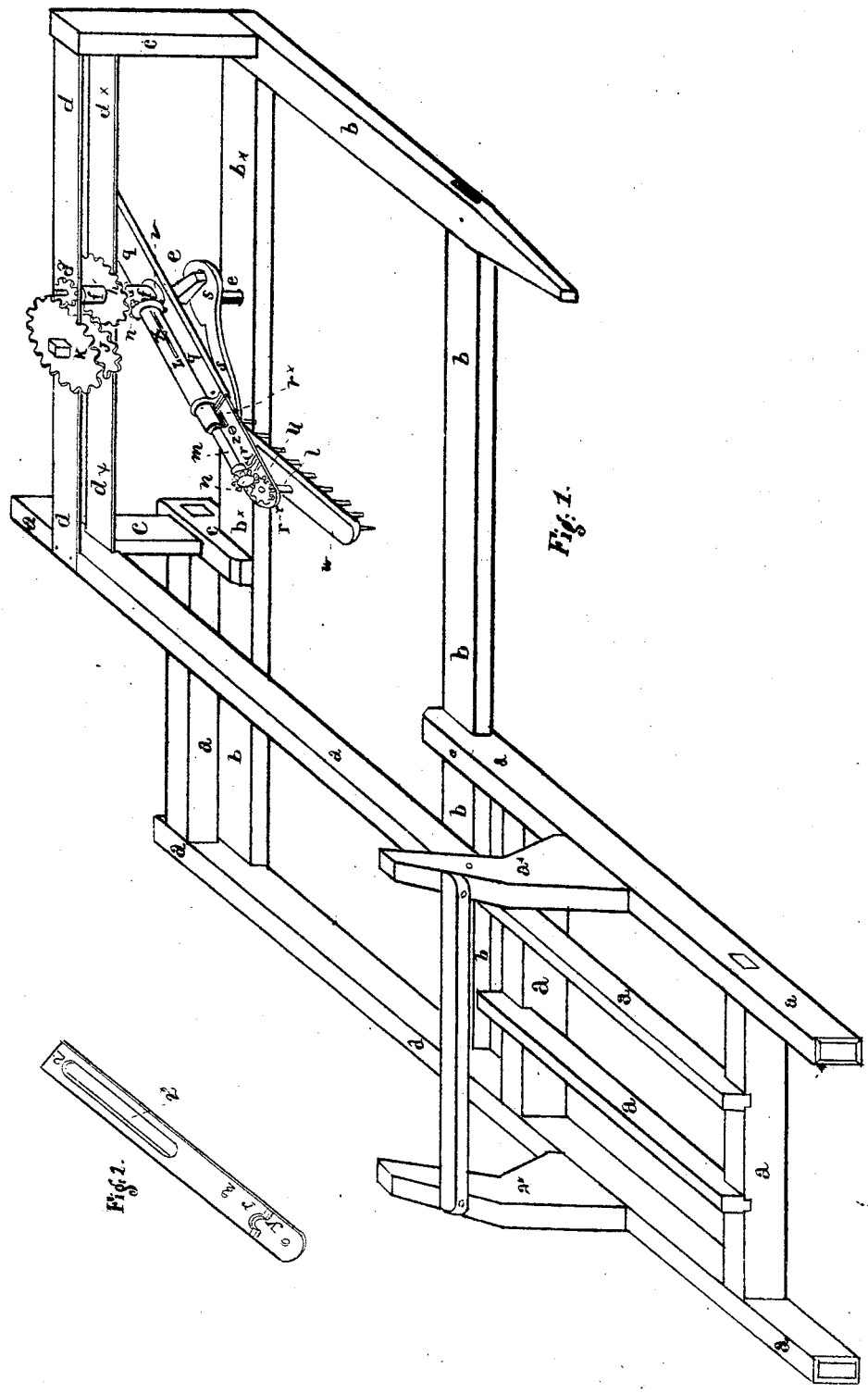

UNITED STATES PATENT OFFICE.

THOS. N. LUPTON, OF WINCHESTER, VIRGINIA.

IMPROVEMENT IN RAKES FOR REAPING-MACHINES.

Specification forming part of Letters Patent No. 13,596, dated September 25, 1855.

*To all whom it may concern:*

Be it known that I, THOMAS N. LUPTON, of Winchester, in the county of Frederick and State of Virginia, have invented and made certain new and useful Improvements in Automatic Rakes for Harvesting and Reaping Machines; and I do hereby declare that the following is a full, clear, and exact description of the same, reference being had to the accompanying drawings, making a part of this specification, in which—

Figure 1 shows a platform or framing, $a\ a\ a\ a\ a\ a\ a\ a\ b\ b\ b\ b\ b\ b\ c\ c\ c$, to which are attached the automatic devices, composed of a vertical crank, $e\ e$, with tubular collar $ff$, spur-wheels and drivers, and bevel-gearing $g\ h\ i\ j\ k\ n\ n^\times\ p$, a revolving sleeve, L, and revolving piston-rod $m$, the slide-socket $q\ q$ and reciprocating arm $r\ r$, the pitman or crank connecting rod $s\ s$, and the horizontal rake $w\ w$; Fig. 2, slotted sliding arm $r\ r$.

To enable others skilled in the art to construct my rake, I herewith describe the same as follows:

A crank, $e\ e$, is formed of desired diameter and length and arranged to and supported vertically by cross-pieces $b^*\ b^*\ d\ d\ d^\times\ d^\times$. The upper part of this vertical crank works through a collar, $ff$. The upper part of this collar $ff$ is attached to a gear-wheel, $h$, working above the cross-piece $d^\times\ d^\times$. At the upper extremity of the crank-shaft is a small spur-wheel, $g$, working in a driving-gear, $k$, having its axle-shaft extending through the cross-piece $d\ d$ downward to the lower cross-piece, $d^\times\ d^\times$, and at the lower end of this axle or shaft is attached a small gear, $j$, working in another of the same diameter, as seen at $h$. Underneath the cross-piece $d^\times\ d^\times$, and attached thereto, is a small inverted bevel-wheel, $i$. The collar $ff$ is attached permanently to a base-plate or bevel-washer, $v$, corresponding to the bevel of the fixed gear $i$. This collar and base work around the crank-shaft, and are attached permanently to a horizontally-working slide-socket, $q\ q$, of suitable size and length. This slide-socket is formed of a strip of thin plate or sheet metal, with turned or flanged edges, thus forming a groove or slide-place, within which is fitted a reciprocating or sliding arm, $r\ r$, having an oblong opening or slot, $r^\times$, Fig. 2, formed in it, sufficiently wide to admit the crank-shaft or spindle to pass through it, as well as long enough to afford the desired play backward and forward. To the slide-socket $q\ q$, at its forward end, is attached a little collar-standard, $o\ o$, which holds or supports a sleeve or tubular socket, L, having a small slot, X, formed longitudinally, and large enough for a small pin or screw, $\&$, to work or slide in. To the back end of this sleeve-socket is attached a small bevel-gear wheel, $n^\times$, with a pivot or small journal end working in the collar $ff$. Within this slotted revolving sleeve or tubular socket L works a revolving piston-rod, $m$, having on its outward end a small bevel-gear, $n$. This revolving piston-rod $m$ is supported by a collar-standard, $y$, attached to the reciprocating arm $r\ r$, to the under side of which arm is attached a crank-rod or pitman, $s\ s$. This pitman is attached to the arm by a screw or a rivet-joint, $z$. At the end of the reciprocating arm $r\ r$, and working pendently therefrom, is a small rod or shaft, $t$, passing upward sufficiently through the arm $r\ r$ to admit of having a small bevel cog-wheel, P, attached to its end, and of the same size as the bevel-gear $n$. To the lower extremity of this pendent rod or shaft $t$ is attached permanently a horizontal rake, $w\ w$, the whole of the within-described devices being shown complete in Fig. 1 and forming my improved automatic rake, which can be most readily attached to or connected with the framing or platform of an ordinary reaping or harvesting machine without requiring any very material alteration of the general mechanical construction of the original machine.

The operation of my rake is as follows: Motion is communicated to the gear-wheel $k$ by any band-and-pulley arrangement or gear-work connected with the general mechanism of the machine, and the gear-wheel $k$, working in the spur-wheel $g$, attached to the crank $e\ e$, gives motion to the said crank $e\ e$, while the spur J, being attached to the same common axle of the gear-wheel $k$, works in the other spur-wheel, $h$, attached to the collar $ff$, which collar extends downward and is attached to the slide-socket $q\ q$ by the base-washer $v$. It will be observed that the crank revolves independently of the wheel $h$, which moves the slide-socket. Thus the crank rotates and the slide-socket revolves around the crank. This crank is connected with the slide-socket through means of the pitman or connection rod $s\ s$, connected to the reciprocating arm $r\ r$ by a pivot or screw-joint, $z$. As the crank rotates the slide-socket $q\ q$ is carried around, and in this movement the revolving sleeve-socket L is also carried around, and at the same time is revolved by the bevel-gear $n^{x}$, working in the stationary or fixed bevel-gear $i$. The revolving piston-rod $m$, as it moves around with the sliding arm $r\ r$, also plays in and out, and as its end bevel-gear, $n$, actuates the bevel-gear l', attached to the rod $t$, the rake $w\ w$ is caused to maintain a parallel position relative to the sides of the machine and the grain-platform, and while the slide-socket $q\ q$ describes a true circle the slotted sliding arm $r\ r$ and the revolving reciprocating piston-rod $m$ both play in and out simultaneously, having a compound motion, and while rotating on their axis revolve or move horizontally and describe a serpentine circuit, by which arrangement the rake $w\ w$ is afforded the required sweep across the grain table or platform of the machine, and thus readily carries the cut grain off in bundles and deposits it on the side or receiving platform of the machine.

The foregoing is a full and accurate description of the construction and operation of my automatic rake, and, being well aware that cranks, pitman-rods, and gear devices have been employed as elements, in part, of the mechanical construction of grain-harvesting machines, I do not wish to be understood as claiming such devices separately; but What I do claim as new and original with myself, and desire to secure by Letters Patent of the United States, is—

The construction of an automatic rake having a revolving tubular or sleeve socket, L, with a revolving extension or reciprocating piston-rod, $m$, a slide-socket, $q\ q$, with a sliding arm, $r\ r$, and a geared rake device, $w\ w$, in combination with the collar $f\ f$, the whole being constructed and operated substantially as described.

T. N. LUPTON. [L. S.]

Witnesses:
   JNO. S. HOLLINGSHEAD,
   I. F. WOLLARD.